(12) United States Patent
Yee et al.

(10) Patent No.: US 6,535,474 B1
(45) Date of Patent: Mar. 18, 2003

(54) NEAR FIELD OPTICAL RECORDING/REPRODUCING DEVICE

(75) Inventors: Young Joo Yee, Kyonggi-do (KR); Jong Uk Bu, Kyonggi-do (KR); Cheol Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/549,157

(22) Filed: Apr. 13, 2000

(30) Foreign Application Priority Data

Apr. 15, 1999  (KR) .............................................. 99-13374

(51) Int. Cl.[7] ................................................. G11B 7/00
(52) U.S. Cl. ................................. 369/112.01; 369/13.33
(58) Field of Search ........................... 369/13.13, 13.46, 369/13.51, 44.21, 44.23, 112.01, 112.07, 112.09, 112.2, 112.23, 112.24, 112.29, 118

(56) References Cited

U.S. PATENT DOCUMENTS 6,154,438 A * 11/2000 O'Hollaren et al. ..... 369/275.3
6,359,852 B1 * 3/2002 Ueyanagi .................... 369/118
6,414,911 B1 * 7/2002 Wilde et al. ............. 369/13.56

OTHER PUBLICATIONS

Hiroyuki Abe et al., "Electron Energy–loss Spectroscopy Study of the Metal–Insulator Transition in $VO_2$" *Japanese Journal of Applied Physics*, vol. 36, Part I, No. 1A (Jan. 1997) pp. 165–169.

J. Tominaga et al., "An Approach for Recording and Read-out Beyond the Diffraction Limit with an Sb Thin Film," *Applied Physics Letters*, vol. 73, No. 15 (Oct. 12, 1998), p. 2078–2080.

* cited by examiner

*Primary Examiner*—Thang V. Tran
*Assistant Examiner*—Bach Vuong
(74) *Attorney, Agent, or Firm*—Morgan, Lewis & Bockius LLP

(57) ABSTRACT

High density near field optical recording/reproducing device, including a light source for emitting a bean of light, a converging lens for converging the light emitted from the light source, and a near filed light generating part formed of a material of which light transmittance is varied with light temperature sectors, thereby overcoming a limit of resolution coming from diffraction, whereby increasing a recording density, significantly.

9 Claims, 2 Drawing Sheets fine position adjustment actuator

NEAR FIELD OPTICAL RECORDING/REPRODUCING DEVICE

BACKGROUND OF THE INVENTION

1. Field of the Invention

The present invention relates to a high density near field optical recording/reproducing device which can increase a recording density significantly by overcoming a limit of light diffraction.

2. Background of the Related Art

In general, the optical data storage technology has been developed significantly centered on CD and DVD technologies, particularly the realization of a semiconductor blue laser, which permits 3 to 4 times of a recording density increase, makes a large capacity optical recording technology available. However, to meet current demands both for information on image of a higher resolution and a small sized, light weight, but large capacity information storage, which is essential for personal information terminal, a leap of increase of information recording density is required. As a technical response to the demands, even though improvements in the recording density of magnetic information recording device, such as hard disk used as supplementary recording device for a computer, the magnetic information recording device has difficulty in increasing the recording density compared to an optical recording medium which uses a concentrated laser beam in nature.

Theoretically, the optical recording technology has a limit of recording density dependent on a wavelength of a laser beam used for recording/reproduction of a data. In the optical recording technology, a minimum length of one bit of data mark can be expressed as the following equation.

$$d = \frac{\lambda}{(2NA)}$$

Where, $\lambda$ denotes a wavelength of the laser beam, which is approx. 650 nm in a case of a semiconductor red laser beam, and approx. 410 nm in a case of a semiconductor blue laser beam. 'NA' denotes a numerical aperture, which is approx. 0.5~0.7 for a general optical system lens. Therefore, a minimum pitch of data tracks which can be distinguished is in a range of a wavelength, which is a limit of size reduction permitted by an increased recording density, that is caused by diffraction of the laser beam. A technology spot lighted to overcome the limit is the near field optical recording technology. In the near field optical recording technology, a light transmissive probe is put near to a beam of light within a wavelength, and input/output of the light through the probe is made possible, for overcoming a spatial resolution limit from the wavelength. As a method for realizing the near field optical recording technology, there is the SIL(Solid Immersion Lens) method of the Terastor in the USA that comes closest to practical use up to now, in which an NA value is increased by using an SIL, which reduces a focus point size of a laser beam used for recording/reproduction, that improves the spatial resolution limit caused by diffraction of light. This method is favorable in view of putting into practical use in that a related art optical recording/reproducing method using a lens system can be utilized. However, even if the SIL is employed, the limitation of the NA value is still a limit in improving the recording density. Other than this method, even though there is the NSOM(Near-Field Scanning Optical Microscopy) in which an optical fiber probe tip is put near to a beam within a wavelength of a recording/reproducing light, the NSOM has not been used for an information recording device because of technical difficulties, such as difficulty in continuously maintaining a distance between the optical fiber probe tip and a disc within a range of the near field, a low data recording/reproducing rate, and the like.

SUMMARY OF THE INVENTION

Accordingly, the present invention is directed to a near field optical recording/reproducing device that substantially obviates one or more and disadvantages of the related art.

An object of the present invention is to provide a near field optical recording/reproducing device which can improve a recording density by using a near field optical recording technology.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the near field optical recording/reproducing device includes a light source for emitting a bean of light, a converging lens for converging the light emitted from the light source, and a near filed light generating part formed of a material of which light transmittance is varied with light temperature sectors.

The near field optical recording/reproducing device further includes a mirror for reflecting the light emitted from the light source toward the converging lens, a package housing for protecting the converging lens and the near field light generating part, and a supporter for supporting the mirror and the package housing.

The near field optical recording/reproducing device further includes a piece of optical fiber, or lens between the light source and the mirror for providing the light from the light source to the mirror.

The near field light generating part is formed of any one selected from $VO_2$, Sb, and AgOx.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
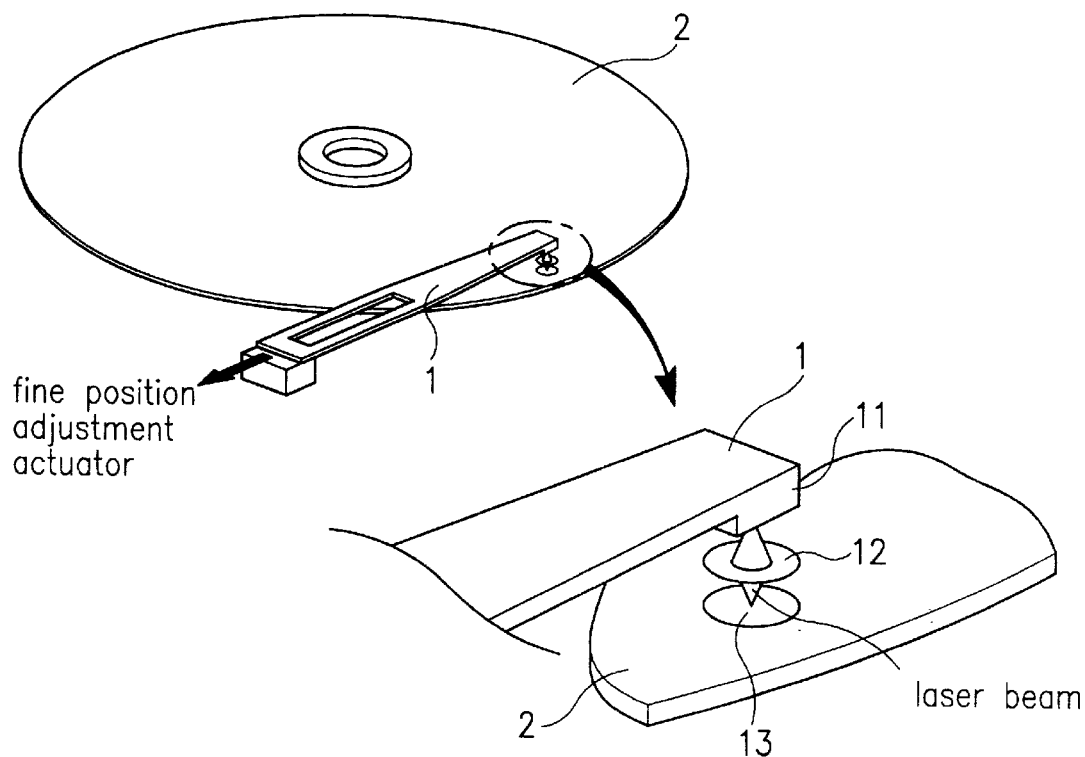
FIG. 1 illustrates a near field optical recording/reproducing device having a thermal aperture in accordance with a preferred embodiment of the present invention, schematically.

Reference will now be made in detail to the preferred embodiments of the present invention, examples of which are illustrated in the accompanying drawings. The present invention suggests a high density information storage which is realized by combining a near field generated by using a thermal aperture formed of a material having a transmittance varied with temperature sectors, realization of a data mark of a size below a wavelength of an input laser beam by using the near field, and positional adjustment of data track pitches by means of a cantilever connected to a fine adjustment actuator. FIG. 1 illustrates a near field optical recording/reproducing device having a thermal aperture in accordance with a preferred embodiment of the present invention, and FIG. 2 illustrates a section of an optical pick up head in FIG. 1.

Figure 2:
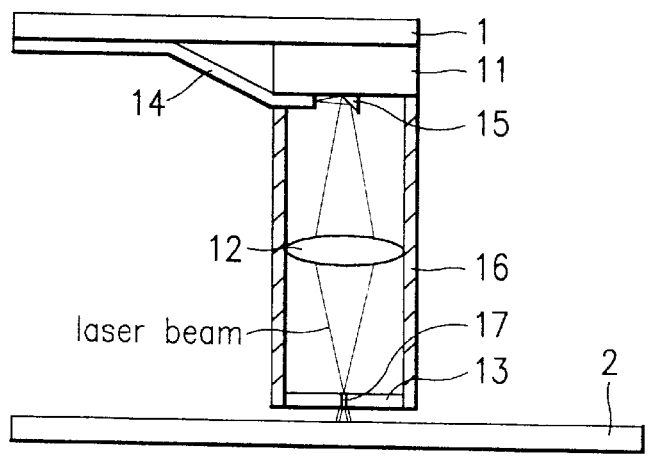
FIG. 2 illustrates a section of an optical pick up head in FIG. 1.

Referring to FIGS. 1 and 2, the near field optical recording/reproducing device includes a cantilever 1 connected to an actuator for fine adjustment of position, a laser diode integrated on the cantilever 1, a mirror mount 11 connected to the cantilever 1, a 45° mirror 15 on the mirror mount 11, a converging lens 12, and a package housing 16 for protecting a near field light generating part 13 of a thin film for generating a thermal aperture. And, there is a piece of optical fiber 14 or lens(not shown) positioned between the laser diode and the 45° mirror 15. The laser beam from the laser diode is incident to the 45° mirror 15 through the optical fiber 14 or the lens, reflected at the 45° mirror 15, converged by the converging lens 12, and transmits the near field light generating part 13. Then, the laser beam, transmitted through the near field light generating part 13, is incident to the optical disk 2 of a phase change material, and makes information recording/reproduction thereon/therefrom. The near field light generating part 13 is formed of a material having a transmittance varied with temperature sectors of the laser beam, such as $VO_2$, or Sb thin film, and AgOx. The $VO_2$ thin film is involved in metal-insulator transition at a temperature ranging 60 ~70° C. at a temperature below which the $VO_2$ thin film transmits no light, and above which the $VO_2$ thin film transmits lights.(Hiroyuki Abe et al, Jpn. J. Appl. Phys. vol. 36, pp. 165–169, 1997). And, the Sb thin film has a light transmittance enhanced at approx. 200° C.(J. Tominaga et al, Applied Physics Letters, vol. 73, no. 15, p2078).

A principle for forming a thermal aperture 17 in the near field light generating part 13 by using an optical property of such a material will be explained with reference to FIG. 3.

Figure 3:
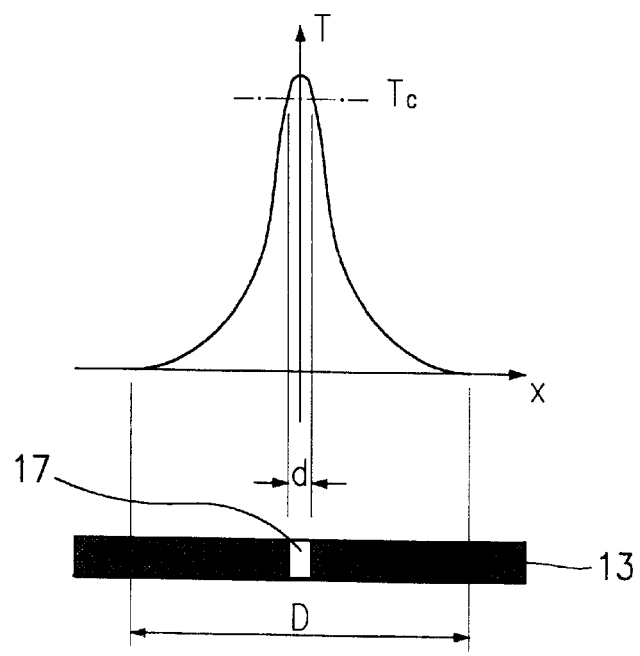
FIG. 3 illustrates a principle of generating the thermal aperture in the near field light generator in FIG. 2; and, FIG. 4 illustrates a principle of near field light generation and information recording/reproduction by means of the thermal aperture.
Figure 4:
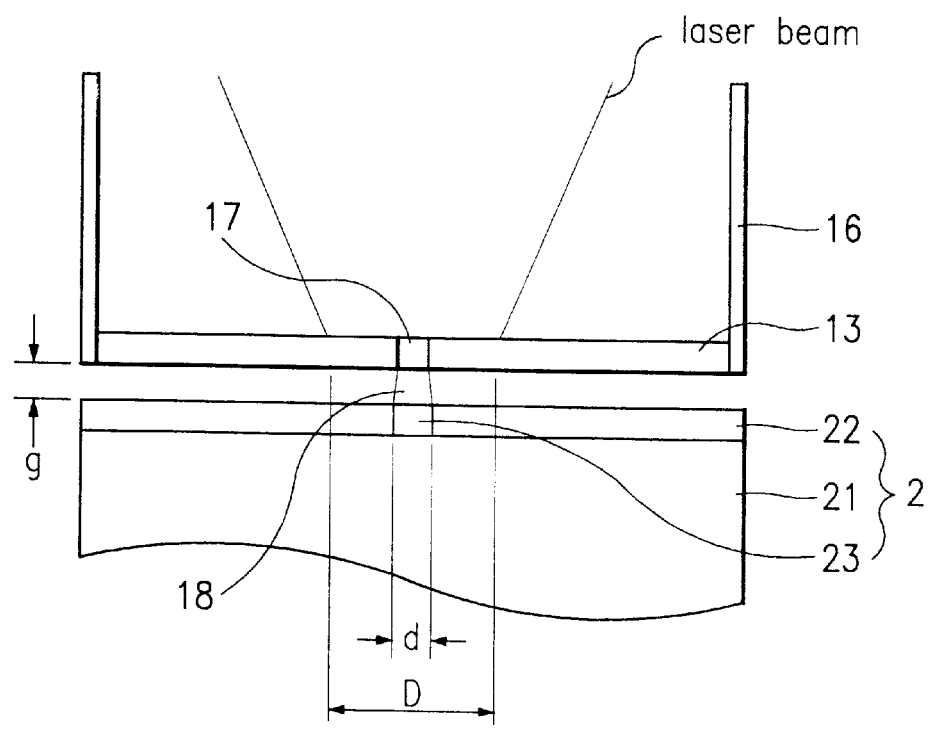

Referring to FIG. 3, upon directing a laser beam onto the near field light generating part 13, an optical intensity distribution of the laser beam causes a temperature distribution of a surface onto which the laser beam directed. In this instance, only a portion of the near field light generating part 13 centered on a light axis(as much as a diameter 'd' in FIG. 3) having a threshold temperature Tc at which the transmittance alters is altered transparent because, as explained, transmission of the laser beam through the near field light generating part 13 is dependent on a temperature of the thin film of the near field light generating part 13. The laser beam transmitted through the transparent portion of the neat field light generating part 13 has a size which can be reduced below the limitation of 'D' of a beam spot size the related art optical system can realizes. As shown in FIG. 4, the laser beam reduced by the thermal aperture 17 of the near field light generating part 13 becomes a near field light 18, and is directed onto a phase change thin film 22 on the surface of the disk substrate 21, to write or read one bit of information 23. In this instance, the near field light 18 can be generated only when a gap 'g' between the near field light generating part 13 and the surface of the disk 2 should be maintained to be below a wavelength of the incident light. Accordingly, in order to maintain the gap 'g' to be below a wavelength of the incident laser beam, the aerodynamic levitation is used.

A method for recording/reproducing information of the aforementioned near field light recording/reproducing device of the present invention will be explained.

First, referring to FIG. 1, in order to write information on a desired position of the disk 2, a fine movement of the optical pick-up head shown in FIG. 2 is made by using the cantilever 1 connected to the actuator. Then, once the optical pick-up is fixed to the desired position, a laser beam is generated at the laser diode, incident to the 45° mirror 15 through the optical fiber 14 or the lens, reflected at the mirror 15, and converged by the converging lens 12 onto the near field light generating part 13. As shown in FIG. 3, of portions of the laser beam incident to the near field light generating part 13, only the portion of the laser beam incident to a portion of the near field light generating part 13 having a temperature higher than the threshold temperature Tc transmits the thermal aperture, and generates a near filed light 18. The near field light 18 is incident to a phase change thin film formed on the surface of the disk substrate 21, to write one bit of information in a high density. Then, by making a fine adjustment of the actuator, to move the pick-up to a desired position, information can be written, continuously. The minimum resolution in the present invention which is dependent on a controllable minimum distance of the fine adjustment actuator is controllable to be below 0.1 $\mu$m. Since a method for reproducing information is the same with the method for recording information, the method for reproducing information will be omitted.

As has been explained, the near field optical recording/reproducing device of the present invention can overcome a limitation of resolution coming from an optical diffraction to increase a recording density significantly, by combining a near field generated by using a thermal aperture formed of a material having a transmittance varied with temperature sectors, realization of a data mark of a size below a wavelength of an input laser beam by using the near field, and positional adjustment of data track pitches by means of a cantilever connected to a fine adjustment actuator.

It will be apparent to those skilled in the art that various modifications and variations can be made in the near field optical recording/reproducing device of the present invention without departing from the spirit or scope of the invention. Thus, it is intended that the present invention cover the modifications and variations of this invention provided they come within the scope of the appended claims and their equivalents.

What is claimed is:

1. A near field optical recording/reproducing device, comprising:
   a light source for emitting a beam of light;
   a converging lens for converging the light emitted from the light source; and
   a near field light generating part for transmitting the converged light to a recording medium, wherein
   the near field light generating part formed of a material of which light transmittance is varied according to a temperature of the beam of light.

2. A near field optical recording/reproducing device as claimed in claim 1, wherein the light source is a laser diode.

3. A near field optical recording/reproducing device as claimed in claim 1, further comprising;
- a mirror for reflecting the light emitted from the light source toward the converging lens,
- a package housing for protecting the converging lens and the near field light generating part; and,
- a supporter for supporting the mirror and the package housing.

4. A near field optical recording/reproducing device as claimed in claim 3, further comprising a cantilever connected to the supporter for moving the supporter.

5. A near field optical recording/reproducing device as claimed in claim 4, wherein the cantilever is connected to an actuator for making fine adjustment of a position.

6. A near field optical recording/reproducing device, as claimed in claim 4, wherein the light source is positioned on the cantilever.

7. A near field optical recording/reproducing device, as claimed in claim 3, wherein the mirror is a 45° mirror.

8. A near field optical recording/reproducing device, as claimed in claim 3, wherein there is a piece of optical fiber, or lens between the light source and the mirror for providing the light from the light source to the mirror.

9. A near field optical recording/reproducing device, as claimed in claim 1, wherein the near field light generating part is formed of any one selected from $VO_2$, Sb, and AgOx.

* * * * *